(12) United States Patent
Guirguis (10) Patent No.: US 10,653,215 B2
(45) Date of Patent: May 19, 2020

(54) ERGONOMIC SILICONE WEDDING RING (71) Applicant: Tough Love Rings, LLC, Cary, NC (US)

(72) Inventor: Rami Guirguis, Cary, NC (US)

(73) Assignee: Tough Love Rings, LLC, Cary, NC (US)

( * ) Notice: Subject to any disclaimer, the term of this patent is extended or adjusted under 35 U.S.C. 154(b) by 264 days.

(21) Appl. No.: 15/479,697

(22) Filed: Apr. 5, 2017

(65) Prior Publication Data

US 2018/0289117 A1  Oct. 11, 2018

(51) Int. Cl.
| A44C 9/00 | (2006.01) |
| B29C 43/20 | (2006.01) |
| A44C 27/00 | (2006.01) |
| B29C 43/14 | (2006.01) |
| B29C 43/02 | (2006.01) |
| B29K 83/00 | (2006.01) |
| B29L 31/00 | (2006.01) |

(52) U.S. Cl.
CPC .............. *A44C 9/00* (2013.01); *A44C 27/001* (2013.01); *B29C 43/027* (2013.01); *B29C 43/146* (2013.01); *B29C 43/203* (2013.01); *B29C 43/145* (2013.01); *B29C 2043/148* (2013.01); *B29K 2083/00* (2013.01); *B29K 2083/005* (2013.01); *B29K 2995/002* (2013.01); *B29L 2031/743* (2013.01)

(58) Field of Classification Search
CPC ....... A44C 9/00; A44C 9/0007; A44C 9/0015; A44C 9/0023; A44C 5/0084
See application file for complete search history.

(56) References Cited

U.S. PATENT DOCUMENTS

| D4,643 S | 2/1871 | Smith |
| D4,644 S | 2/1871 | Smith |
| D29,797 S | 12/1898 | Pratt |
| D33,674 S | 12/1900 | Bliss, Jr. |
| D42,412 S | 4/1912 | Bliss |
| D99,688 S | 5/1936 | Tomlinson |
| 2,812,604 A * | 11/1957 | Nelson .................. A44C 9/003 40/111 |
| 3,606,766 A | 9/1971 | Hill |
| D285,275 S | 8/1986 | Pollitz |
| D383,053 S | 9/1997 | Schrader et al. |
| D383,378 S | 9/1997 | Schrader et al. |
| D480,981 S | 10/2003 | Pasquetti |

(Continued)

FOREIGN PATENT DOCUMENTS

| AT | 12330 U1 * | 4/2012 | .......... A44C 5/0092 |
| AT | 12330 U1 | 4/2012 | |

(Continued)

OTHER PUBLICATIONS

USPTO; Non-Final Office Action for U.S. Appl. No. 15/479,860 dated Sep. 25, 2018, 6 pages.

(Continued)

*Primary Examiner* — Emily M Morgan
(74) *Attorney, Agent, or Firm* — NK Patent Law (57) ABSTRACT

The present invention is an ergonomic silicone wedding ring comprising of 3 bands which are designed not to separate easily and are thinner, more ergonomic and comfortable than prior silicone tri-band rings.

3 Claims, 6 Drawing Sheets

(56) References Cited

U.S. PATENT DOCUMENTS

| | | | |
|---|---|---|---|
| D531,077 S * | 10/2006 | Waldmann | D11/39 |
| 7,216,508 B2 | 5/2007 | Kretchmer et al. | |
| D575,827 S | 8/2008 | Tanaka | |
| D583,418 S | 12/2008 | Tanaka | |
| 8,157,048 B2 | 4/2012 | Banter et al. | |
| D664,839 S | 8/2012 | Bonhag et al. | |
| D668,985 S | 10/2012 | Huynh | |
| D670,776 S | 11/2012 | Fossum et al. | |
| D692,790 S | 11/2013 | Goerges | |
| D717,637 S | 11/2014 | Rast | |
| D750,994 S | 3/2016 | Baker et al. | |
| D751,447 S | 3/2016 | Baker et al. | |
| D751,448 S | 3/2016 | Baker et al. | |
| D753,010 S | 4/2016 | Riviére | |
| D780,615 S | 3/2017 | Baker et al. | |
| D784,182 S | 4/2017 | Baker et al. | |
| D787,363 S | 5/2017 | Faught | |
| D789,231 S | 6/2017 | Baker et al. | |
| D789,232 S | 6/2017 | Baker et al. | |
| D801,209 S | 10/2017 | Herman | |
| 9,943,146 B2 | 4/2018 | Baker et al. | |
| D819,482 S | 6/2018 | Herman | |
| 2004/0020242 A1 * | 2/2004 | West | A44C 9/00 63/15 |
| 2007/0137250 A1 | 6/2007 | Kohl | |
| 2009/0038339 A1 * | 2/2009 | Chen | A44C 9/0015 63/15 |
| 2009/0293541 A1 * | 12/2009 | Webb | A44C 9/0015 63/3 |
| 2015/0344993 A1 | 12/2015 | Derrig | |
| 2016/0345692 A1 * | 12/2016 | Baker | A44C 27/001 |
| 2017/0027289 A1 * | 2/2017 | Braun | A44C 9/0023 |
| 2017/0196320 A1 * | 7/2017 | Sato | A44C 9/00 |
| 2018/0035768 A1 | 2/2018 | Goodwin | |
| 2018/0199681 A1 | 7/2018 | Baker et al. | |
| 2018/0289117 A1 | 10/2018 | Guirguis | |
| 2018/0289118 A1 | 10/2018 | Guirguis | |
| 2019/0006742 A1 | 1/2019 | McLear et al. | |
| 2019/0116946 A1 | 4/2019 | Jones et al. | |

FOREIGN PATENT DOCUMENTS

| | | | | |
|---|---|---|---|---|
| EP | 2478791 A1 * | 7/2012 | | A44C 9/0015 |
| EP | 2478791 A1 | 7/2012 | | |

OTHER PUBLICATIONS

USPTO; Final Office Action for U.S. Appl. No. 15/479,860 dated Apr. 12, 2019, 8 pages.

USPTO; Non-Final Office Action for U.S. Appl. No. 29/599,636 dated Sep. 5, 2019, 5 pages.

"Thin Blue Line Silicone Ring" http://defenderup.com/2016/02/29/thin-blue-line-ring./ Posted online Feb. 29, 2016. Retrieved Aug. 30, 2019.

"Tough Love Rings—Thin Line Series" https://www.amazon.com/Tough-Love-Rings-Silicone-Lifestyles/dp/B01CFR1C66?th=1. Posted online at least as early as Jun. 8, 2016 based on reviews. Retrieved Aug. 30, 2019.

"Silicone Wedding Rings" https:///stunning-weddingrings.blogspot.com/2016/03/silicone-wedding-rings.html. Posted Mar. 4, 2016. Retrieved Aug. 30, 2010.

* cited by examiner

ERGONOMIC SILICONE WEDDING RING

RELATED APPLICATIONS

The application Ser. No. 15/479,860 filed on even date herewith is hereby incorporated by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a molded ring and a method of making the ring. In particular, it relates to a ring and method of making a silicone ring of three bands with improved durability and ergonomics.

Description of Related Art

The wearing of a wedding band is historically widespread. To avoid the risks of wearing a conventional metal wedding band, silicone wedding bands provide a safe and cost effective alternative since it is resistant to extreme temperature, resistant to abrasions and chemicals and more comfortable than a metal wedding band.

One version of such ring involves a 3-band compression molded ring, such as taught in US patent publication No. 2016/0345692 (Baker, at al.). The middle band is created by placement of a piece of silicone in a cavity between platforms in opposing plates. Compression is utilized to form the middle band and fuse it to the outer two bands. The cavity is formed by the platform being shorter than the mold cavity. These bands have flat circumferential edges on either side with a middle band usually of a different color than the outer two bands. This process produces a ring but it has a huge tendency for the individual rings to separate into individual bands after even minimal use. While the rings are not as expensive as metal rings, one doesn't want their rings to be replaced when they have sentimental value of any kind. Further, the flat edges are uncomfortable and not very ergonomic. In addition, existing silicone ring bands have been observed with thicknesses of up to approximately 2.5 mm, which can be uncomfortable, less ergonomic and in some cases, rendering it nonfunctional to the wearer.

BRIEF SUMMARY OF THE INVENTION

The present invention relates to a new way of making such rings, and the rings themselves, which overcomes the problems of the prior art silicone wedding rings. Firstly, a groove on the inside of the two outer bands is created such that some of the middle ring silicone fills the groove, creating a larger surface area contact. Secondly, the cavity created by a short platform is eliminated, creating a different pressure, forcing the 3 bands together much more tightly than the method of the prior art. In addition, the rings have a rounded outer edge, rather than the flat edge of the prior art, leading to a thinner, more comfortable and more ergonomic ring to wear.

In one embodiment, the invention is a method of manufacturing a triband silicone ring comprising:

a) forming by compression molding a first and second outer bands of a silicone ring, each outer band having a curved outer edge and an inner edge having a channel formed therein;

b) selecting a first compression mold having a spacer plate positioned over the first compression mold wherein the compression mold has a first ring cavity with a first platform whose upper portion is leveled with an upper portion of the spacer plate;

c) placing the first outer band in the first compression mold with the channel facing up;

d) placing the second outer band in a second compression mold with the channel facing down, the second compression mold having a second ring cavity and a second platform;

e) placing a piece of silicone rubber on the first platform of the first compression mold;

f) positioning the second compression mold over the spacer plate such that first and second platforms are facing each other; and g) positioning the first compression mold, spacer plate, and second compression mold assembly in a compression molding device to form a silicone ring having two outer and one inner bands.

In another embodiment, the invention relates to a threeband silicone ring comprising a first and second outer bands and a middle band, each outer band comprising a portion of the middle band molded into a channel in a circumferential inner surface of the outer band, and each first and second outer band having a curved outer edge.

DETAILED DESCRIPTION OF THE INVENTION

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "triband or three-band silicone ring" refers to a wedding style finger ring having a top middle and bottom bands fused together to form a single ring as shown in the Figures. In this invention, the ring is made differently than previous triband rings to eliminate the tendency of these rings to separate after molding. The present rings have rounded edges (unlike the flat edges of previous rings), they have a portion of the middle band which is molded into each of the outer bands and lastly, the molding method is different relying on the platform not forming a cavity with the top of the spacer plate used. In one embodiment, the bands have a thickness (measured at the thickest part, i.e. the middle) of at least about 1.25 mm to less than about 2.0 mm. In one embodiment, they are an average of about 1.8 mm thick. These bands, when compared to prior art bands which are 2.5 mm thick on each side, are about 1.5 mm thinner, counting both sides, leading to overall thinner diameter and thus more comfortable and ergonomic. The molds are adapted accordingly to provide these embodiments.

As used herein the term "compression molding" refers to the method of forming, molding and bonding by using both pressure and heat on polymers, like the silicone bands of the present invention.

Figure 2:
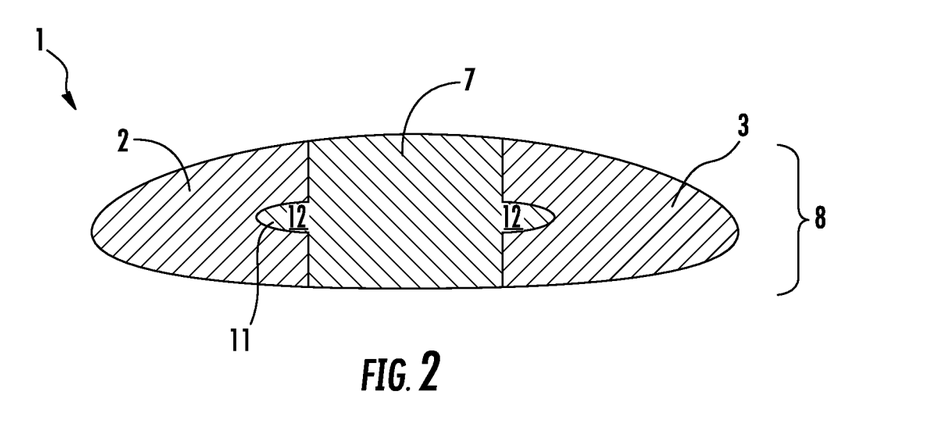
FIG. 2 is a cross section of a ring.

As used herein the term "outer band with curved edge and channel" refers to the top and bottom bands of the finished ring. These bands are identical and can be utilized interchangeably. The portion of the band which forms the outer edges of the ring is curved and not flat. Precise angles of curves can be determined, but as show in the figures, a gentle curve is intended. The inner edge of the inner and outer band is the edge that is bonded to the middle band of the ring. In compression molding these bands, a channel is formed roughly in the middle of the edge, as shown in the Figures, sufficient for a portion of the middle band to enter and become part of the outer bands. The cross section in FIG. 2 shows in detail an embodiment of this structure.

As used herein the term "spacer plate" refers to the first mold being a two-piece mold as known in the art to aid in removing the finished rings from the molds. The first mold has platforms which form the inner part of the ring opening for a finger. In previous methods, there has been a cavity, i.e. the top of the platform is lower that the top of the spacer. However, in this invention, the top of the platform is essentially even with the top of the spacer.

As used herein the term "platform" refers to the center part of the mold cavity which is raised to form the center opening of the ring as shown in the Figures.

As used herein the term "positioning first and second outer bands" refers to positioning one outer band channel up in the first mold and then with the second mold facing downward toward the first mold, as shown in the Figures, facing another outer band with the channel facing downward, i.e. the channels facing each other as the two molds are brought together for compression molding.

As used herein the term "placing silicone rubber" refers to placing a piece of silicone rubber, in one embodiment a rectangular piece, such that it rests on the platform and any overlap rests on the top surface of the spacer as shown in the Figures.

As used herein the term "placing first and second molds together" refers to bringing the molds together to be compression molded together and thus form the ring. The general Figures show how this is done in detail.

DRAWINGS

Figure 1:
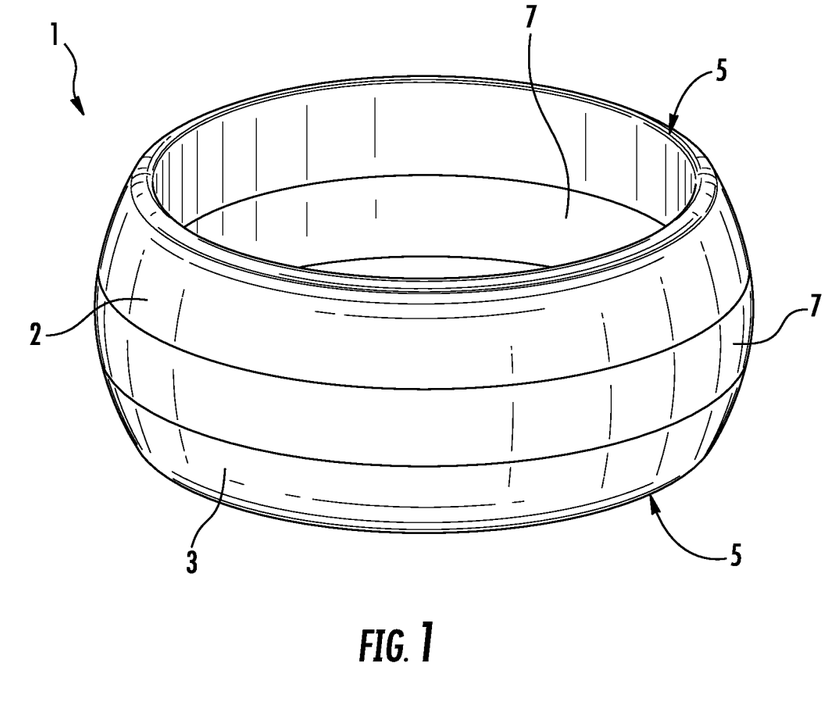
FIG. 1 is a ring of the invention.

Now referring to the drawings, FIG. 1 is a front perspective of a ring of the present invention. In this view, ring 1 has first 2 and second 3 outer bands of silicone wherein each has a curved 5 (and not flat) outer edge which is ergonomic in design. Both outer bands 2 and 3 are silicone, formed by compression molding, and have a channel (shown in other Figures) circumferentially on the inner edge that meets the inner band 7. They are then formed together with silicone between them to form the inner band 7.

FIG. 2 is a cross section of formed ring 1 showing first 2 and second 3 outer bands as well as inner band 7. In this cross section view, it can be seen that a ridge portion 12 of the inner band 7 has filled into circumferential channels 11 of the first 2 and second 3 outer bands to become a part of those two bands. This difference in structure aids in the rings resisting separating into individual, separate bands after time. Further, the width 8 of these bands is thinner than the prior art bands and thus more comfortable and ergonomic. The width is measured at the widest point on the bands.

Figure 3A:
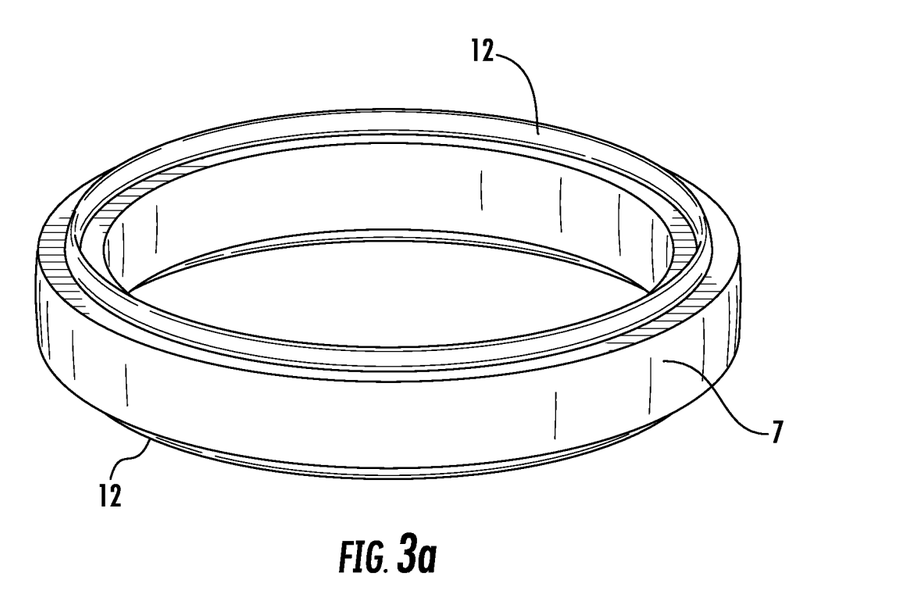
FIG. 3a is an inner band showing the middle band showing the ridge.
Figure 3B:
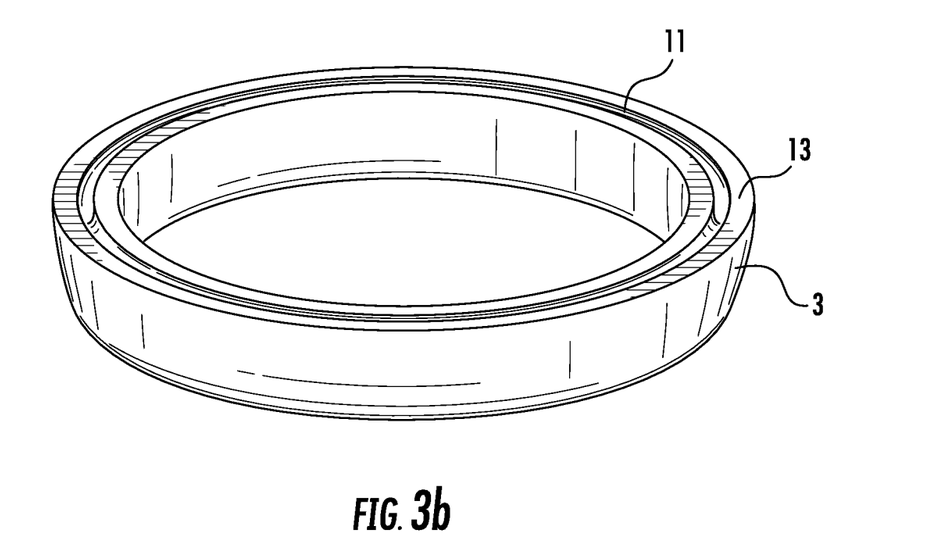
FIG. 3b is an outer band alone, showing the channel.

FIG. 3a is a perspective view of the middle band 7 which shows a top and bottom ridge portion 12. FIG. 3b is a perspective view of just the second outer band 3 before forming into ring 1. In this view, it can be seen that when the band is compression molded, a circumferential channel 11 is formed on the inside edge 13 of the outer band 3.

Figure 4:
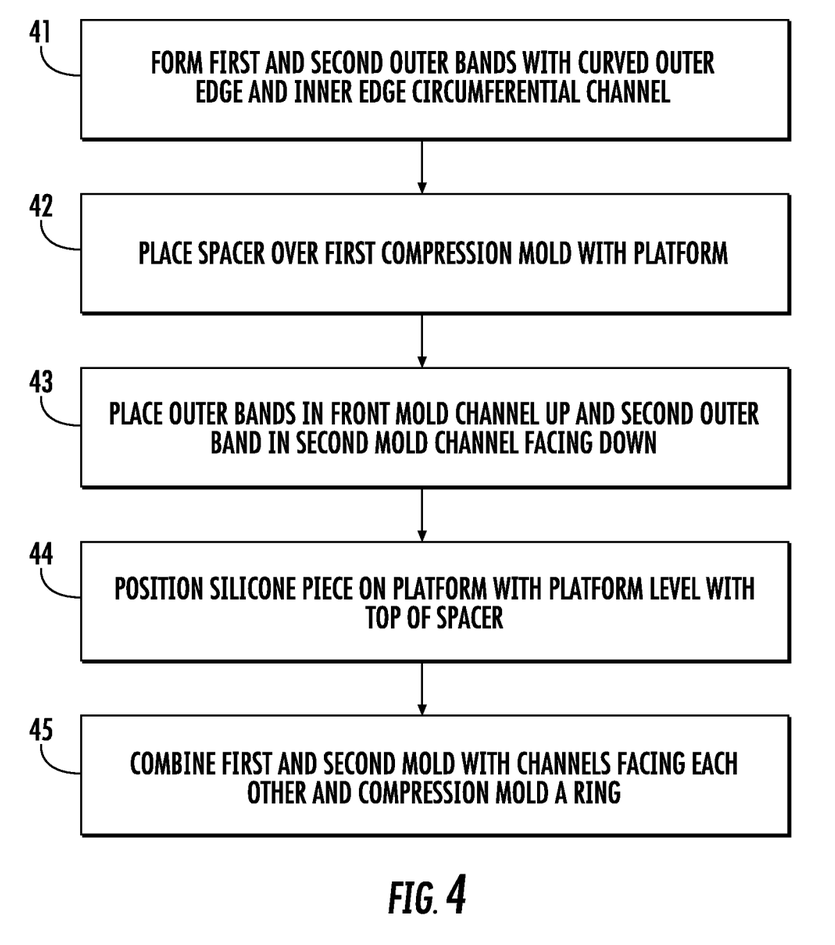
FIG. 4 is a flow chart of the method of the invention.

FIG. 4 is a flow chart of the method of manufacture of ring 1 of the present invention. First, a first and second outer bands with a curved outer edge and an inner edge circumferential channel is formed by compression molding 41. Next, a spacer is placed over the a first compression mold 42. That is followed by the outer bands placed in the first and second molds with the inner surface channels facing each other 43. Next, a piece of silicone is placed on the platform with it optionally overlapping onto the spacer 44. Finally, the first and second mold with channels facing each other and the silicone piece on the platform (no platform cavity formed between the platform and spacer top) put together and compression molded to form a ring of the present invention 45.

Figure 5:
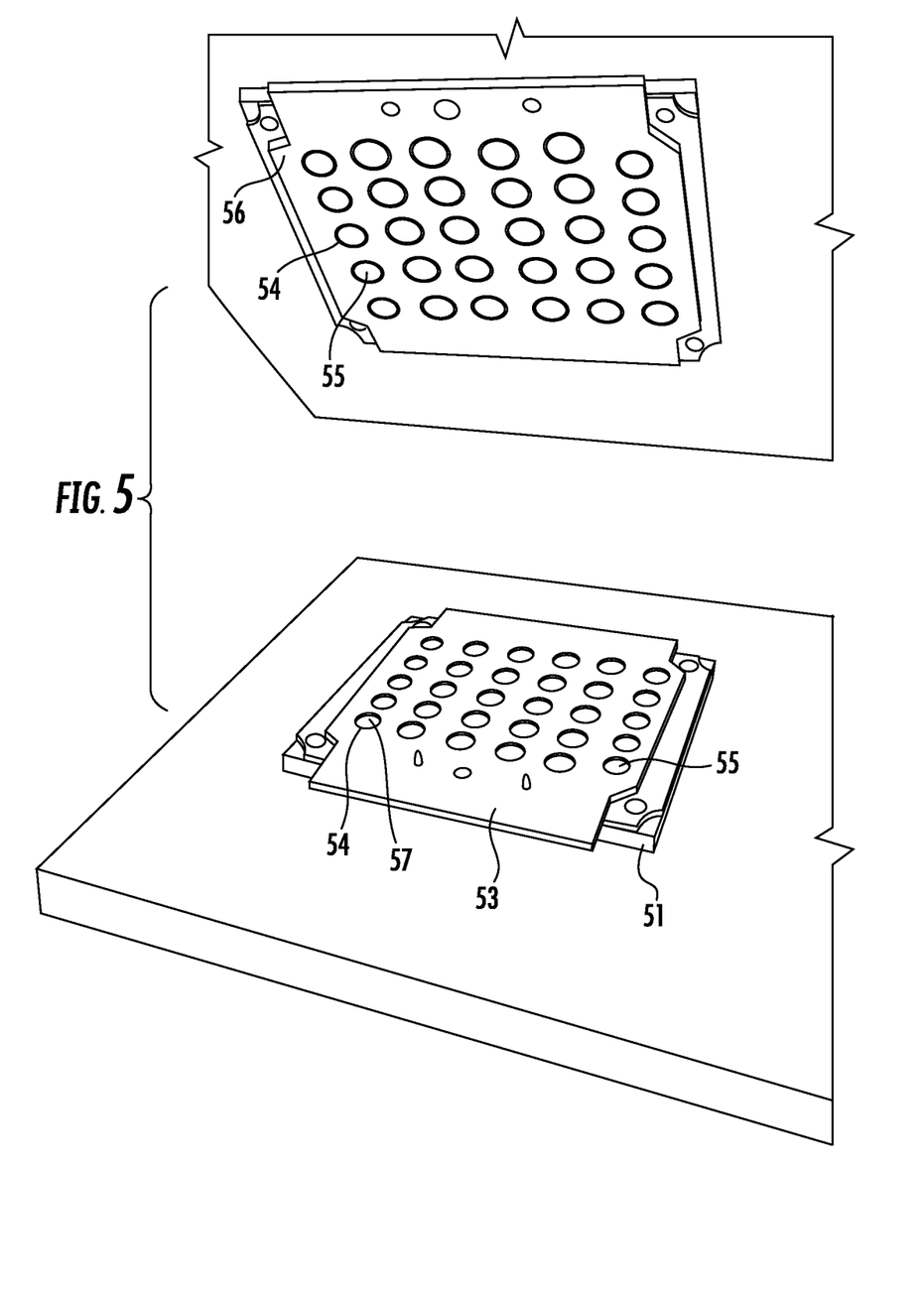
FIG. 5 is the first mold facing up and second mold facing downward, both in a compression molding device.
Figure 6:
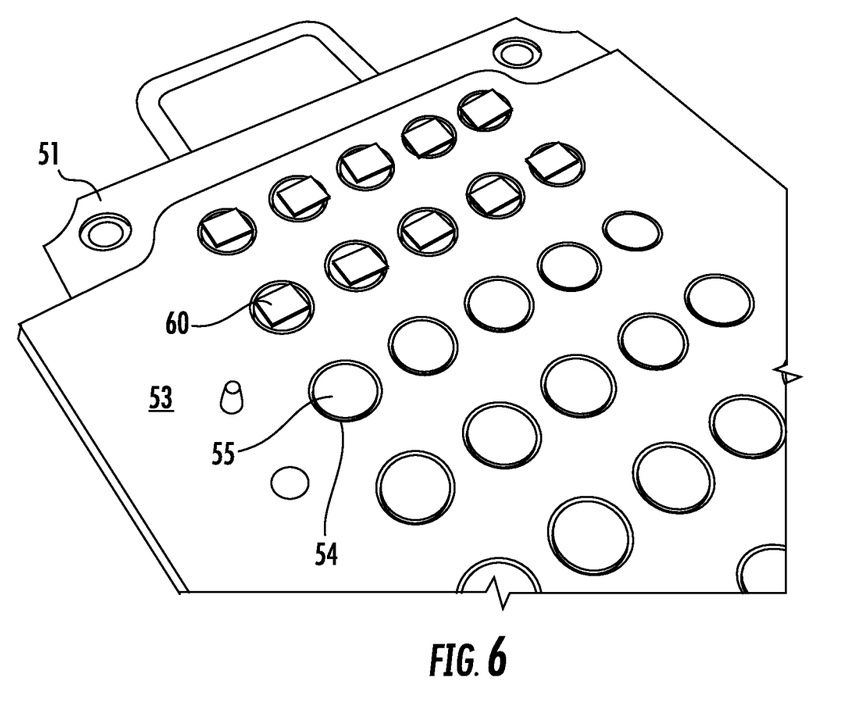
FIG. 6 shows the loading of silicone piece on the platform.
Figure 7:
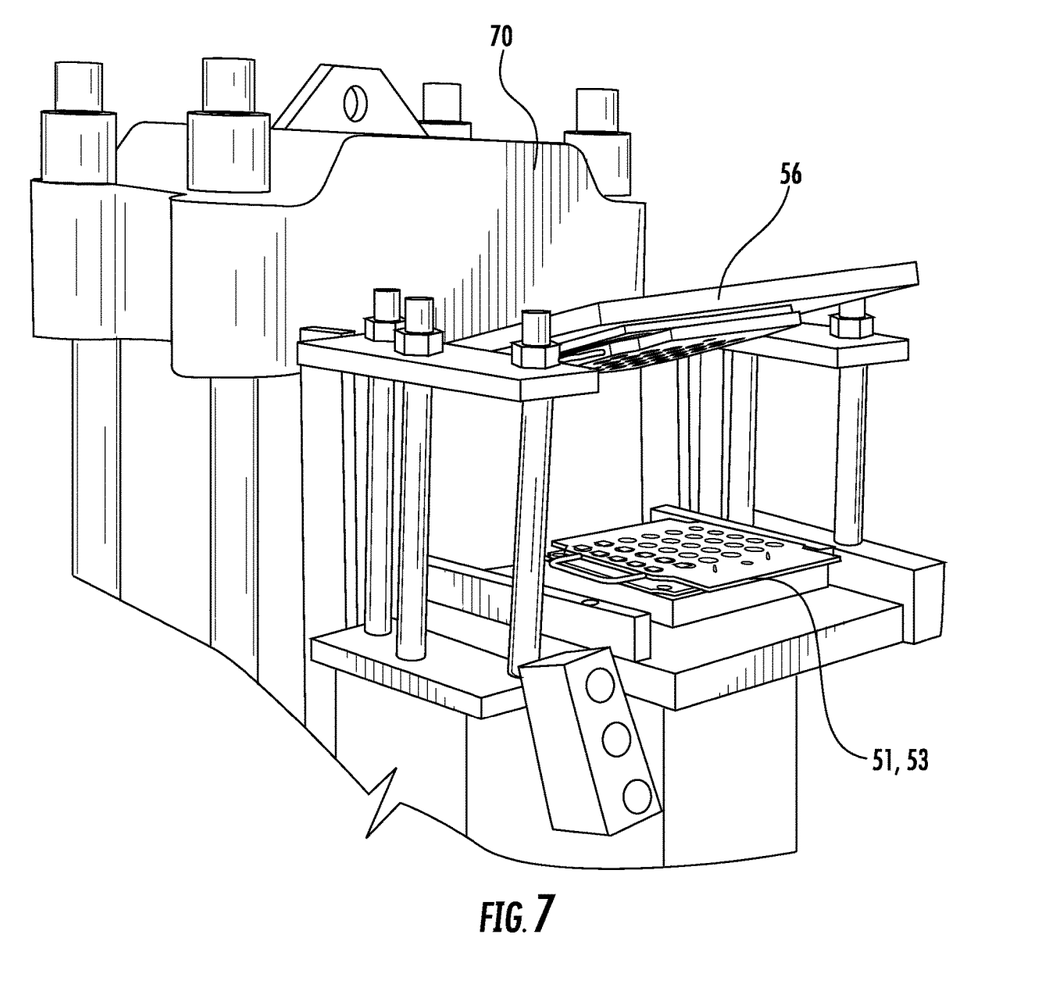
FIG. 7 shows the first and second molds coming together to compression mold the rings.

FIG. 5 is a perspective view of the molds utilized in the present method. First, mold 51 with spacer 53 is sitting face up with an outer band positioned in each ring cavity 54, such that the channel is facing up. Platforms 55 are shown in this view. Second, mold 56 has outer bands loaded in ring cavity 57, in this view, with the channel facing downward. FIG. 6 shows first mold 51 with spacer close up. The placement of a rectangular piece of silicone 60 on a platform 55 is shown with, in most cases, the silicone 60 overlapping onto the spacer 53. In FIG. 7, the first 51 and second 56 molds are brought together with channels facing each other, compression molded, using compression machine 70 with heat and pressure to form a ring of the present invention.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A three-band silicone ring comprising:
   a first outer band and a second outer band, each outer band having a curved outer edge and a channel in a circumferential inner edge,
      wherein each outer band is tapered such that the curved outer edge is thinner than the circumferential inner edge, and
      wherein an opening of the channel at the surface of the circumferential inner edge of each outer band is a widest part of the channel; and
   a middle band having a first ridge portion and a second ridge portion on opposite circumferential inner edges of the middle band, each ridge portion extending from the circumferential inner edge such that each ridge portion is substantially the same shape as the channel in each of the outer bands;
   wherein the first ridge portion of the middle band is fused to the channel in the first outer band at a first interface and the second ridge portion of the middle band is fused to the channel in the second outer band at a second interface, with each channel and each corresponding ridge portion providing additional surface area for contact for the fusing at each interface between the middle band and each outer band; and
   wherein the first and second outer bands and the middle band are made of silicone.

2. The ring according to claim 1 wherein the bands have a thickness at a widest part of the band of about 1.8 mm.

3. The ring according to claim 1 wherein a cross-section of each channel is in a shape of a rounded arc.

* * * * *